United States Patent [19]
Hoar et al.

[11] Patent Number: 5,823,284
[45] Date of Patent: Oct. 20, 1998

[54] UTILITY VEHICLE

[75] Inventors: David L. Hoar, Fredericton; Ronald G. Mersereau; Larry A. Welton, both of Sunbury County, all of Canada

[73] Assignee: Central Mechanical Ltd., Hoyt, Canada

[21] Appl. No.: 532,156

[22] Filed: Sep. 22, 1995

[30] Foreign Application Priority Data

Sep. 22, 1994 [CA] Canada ................................. 2132684

[51] Int. Cl.$^6$ ................................................. B60K 17/356
[52] U.S. Cl. ........................ 180/240; 180/234; 180/242; 180/308; 180/414; 280/91.1
[58] Field of Search .............................. 180/21, 233, 234, 180/240, 242, 252, 291, 297, 305, 308, 400, 408, 409, 416, 89.1, 311, 411, 414; 280/771, 91.1

[56] References Cited

U.S. PATENT DOCUMENTS

| | | |
|---|---|---|
| 1,956,583 | 5/1934 | Morgan . |
| 2,274,821 | 3/1942 | Bloxom . |
| 2,910,131 | 10/1959 | Krotz . |
| 3,053,547 | 9/1962 | Osborne ............................. 180/234 X |
| 3,075,784 | 1/1963 | Beyerstedt . |
| 3,279,813 | 10/1966 | Linsay . |
| 3,282,366 | 11/1966 | Strague .................................... 180/240 |
| 3,359,727 | 12/1967 | Hann et al. . |
| 3,435,615 | 4/1969 | Genz et al. . |
| 3,448,577 | 6/1969 | Crawford . |
| 3,509,721 | 5/1970 | Crawford . |
| 3,529,422 | 9/1970 | Herndon, Jr. . |
| 3,641,765 | 2/1972 | Hancock et al. . |
| 3,656,570 | 4/1972 | Gortnar et al. ...................... 180/308 X |
| 3,808,813 | 5/1974 | Spinks . |
| 3,835,647 | 9/1974 | Huffman . |
| 3,892,072 | 7/1975 | Harvey . |
| 3,957,130 | 5/1976 | Hammersmith . |
| 3,972,189 | 8/1976 | Knapp et al. . |
| 4,235,297 | 11/1980 | Porta .................................. 180/317 X |
| 4,535,868 | 8/1985 | Mather et al. ...................... 180/89.1 X |
| 4,617,797 | 10/1986 | Williams . |
| 4,705,135 | 11/1987 | Kawamoto et al. . |
| 4,796,720 | 1/1989 | Bauer . |
| 5,211,015 | 5/1993 | Schroeder . |
| 5,265,422 | 11/1993 | Watts . |

FOREIGN PATENT DOCUMENTS 1217695 2/1987 Canada .

*Primary Examiner*—Anne Marie Boehler
*Attorney, Agent, or Firm*—Ian Fincham

[57] ABSTRACT

A vehicle having a hydrostatic drive and transmission having multi-range speed modes, a counter configured steering assembly providing for a turning radius less than would normally be commensurate with the length of the wheel base, and a suspension system having a resiliently deformable device for maintaining stability of the vehicle body and cargo during operation and for maximum operator comfort.

11 Claims, 10 Drawing Sheets

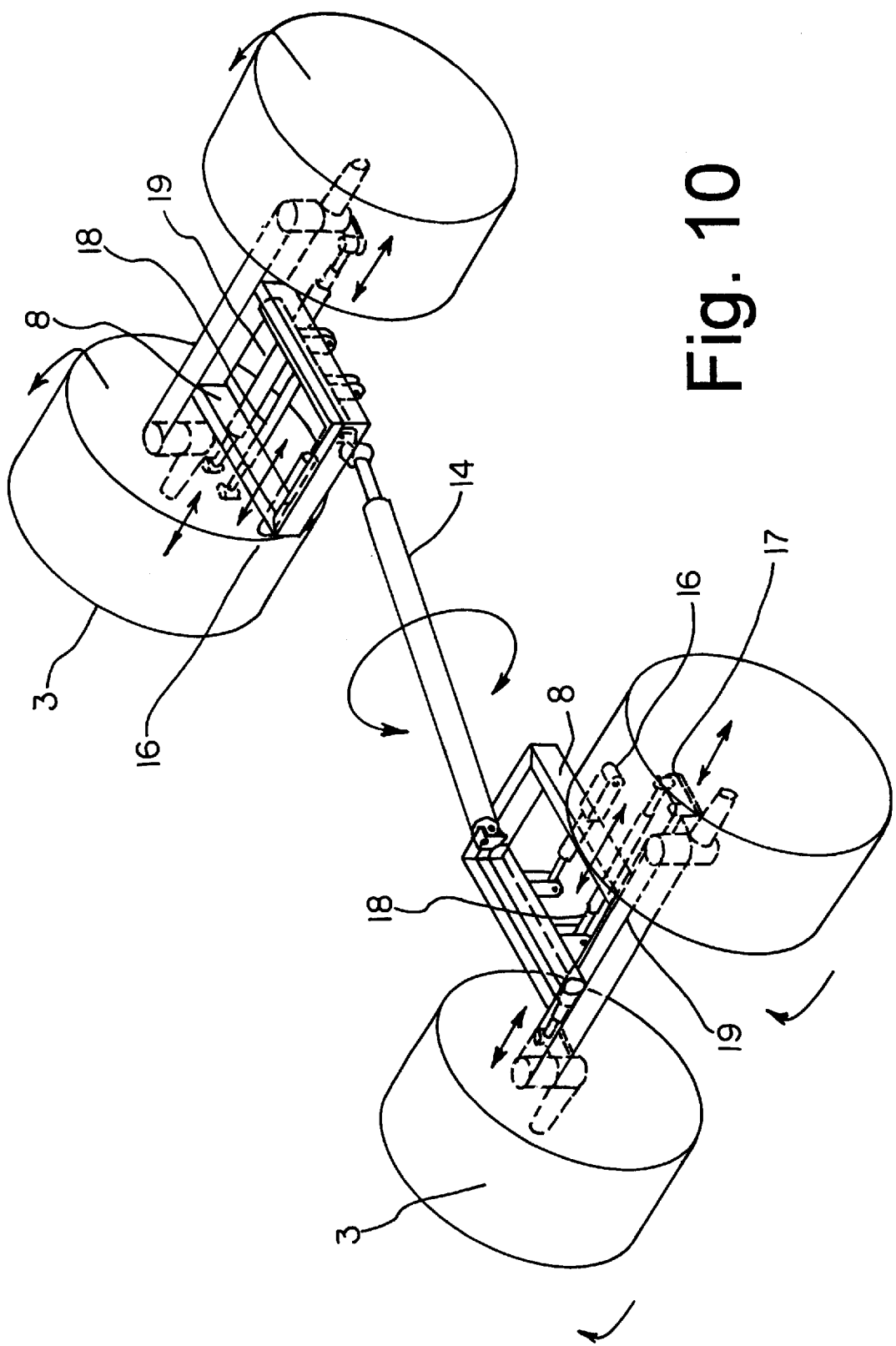

UTILITY VEHICLE

FIELD OF THE INVENTION

This invention relates to a utility vehicle for use in industrial environments such as underground mining and in particular a vehicle having a hydrostatic drive system with hydrostatic multi-speed transmission, with both forward and rear wheels being fully steerable and the vehicle body being supported by a suspension system having a resiliently deformable device.

BACKGROUND OF THE INVENTION

At present, working conditions in mining environments are subject to space constraints. As a result, there are limitations on the size of utility vehicles which can be used. Limiting vehicle size often results in a corresponding reduction in payload and pulling capacity because typically highway vehicles are converted for such applications.

SUMMARY OF THE INVENTION

One object of the present invention is to provide an improved utility vehicle.

Advantageously, with the present invention, there has been developed a utility vehicle which is larger than typical highway vehicles, but which still meets the requirements of mining environments by being both compact and highly manoeuvrable and yet powerful enough to meet operational needs. These objectives are met via a vehicle which incorporates a hydrostatic drive system along with forward and rear wheels being fully steerable.

While hydrostatic drive systems for vehicles are known in the prior art, such as in U.S. Pat. No. 3,448,577, they do not offer multi-range speed modes of operation for a given pump displacement from one fluid supply pump to individual wheel motor means without the addition of expensive and cumbersome transmissions and drive line components. With the present invention, this limitation is overcome through the use of a valve block assembly for altering fluid flows within fluid passages of the drive system and thus offering multi-range speed modes of operation for a given pump displacement which is not found in conventional hydrostatic drive and transmission systems. The multi-speed transmission provides for a very responsive transition between high and low speeds, increases the operational flexibility of the vehicle and allows it to be used in various work environments and in the case of mining operations, in both underground and above-ground where the respective speed requirements are different.

Another object of the present invention is to provide a hydrostatic drive system which also provides for a braking function to slow the vehicle.

A further object of the present invention is to provide a steering system for steering a vehicle having wheels, comprising:

first and second actuatable linkage means for actuating the wheels;

first and second actuation means for actuating the first and second linkage means, respectively, the actuation means including:

a plurality of rotatable shafts, at least two of the shafts being in a spaced and opposed relationship, the at least two shafts being sequentially rotatable; and fluid drive means for effecting rotation of each of the at least two shafts.

In one embodiment, the steering system makes use of fluid pistons. Marked advantages are realized by making use of the pistons. As is well known, fluid mechanical drives offer smoother and quieter motion and additionally are much more precise and less susceptible to mechanical failure compared to multiple link steering systems or rack and pinion such as in U.S. Pat. No. 3,075,784.

Another object of the invention is to maintain the stability of the vehicle body under working conditions and to maximize operator comfort. This object is met through use of a suspension system having a resiliently deformable device which supports the vehicle body.

Yet another object of the invention is to provide a vehicle which is mechanically simple to facilitate construction and servicing.

In accordance with the present invention, according to one aspect thereof, there is provided a vehicle comprising a vehicle frame and a vehicle chassis, a hydrostatic drive means, the said drive means including a hydrostatic transmission means having multi-range speed modes of operation, a counter configured steering assembly providing for a turning radius which is less than would normally be commensurate with the length of the wheel base, and a suspension system having a resiliently deformable device for suspending the vehicle frame and the vehicle chassis for maintaining stability of the vehicle body and cargo during operation and for maximum operator comfort.

In a preferred embodiment, the above vehicle includes a hydrostatic drive means with fluid circulating through fluid passages being in fluid communication which each other, to wheel motor means.

In another embodiment, the above vehicle includes a motor means comprising individual wheel motors.

In yet another embodiment, the above vehicle includes a transmission means which comprises fluid passages with a valve assembly which can alter the fluid flow within the passages and to the said motors and thus change the speed of operation of said motor means.

In still a further embodiment, the above vehicle includes a valve assembly comprising one or more valves which are either opened or closed depending upon the desired path of fluid flow within the fluid passages corresponding to a desired speed of operation.

In another embodiment, the above vehicle includes a steering assembly which is counter-configured such that one set of wheels are turned in a direction counter to the other set of wheels and by an identical amount, the front and rear steering timing being controlled by a central rotatable shaft assembly to ensure equal turning of all of the wheels.

In another embodiment, the above vehicle includes a shaft rotated by hydraulic means and wherein the rotational motion of the shaft is transferred to the wheels to turn them by linkage means.

In another embodiment, the above vehicle includes suspension and drive systems which are fabricated in a wishbone configuration.

Having thus generally described the invention, reference will now be made to the accompanying drawings illustrating preferred embodiments.

BRIEF DESCRIPTION OF THE DRAWINGS

FIG. 10 is a perspective view of the steering assemblies.

Similar numerals denote similar elements throughout the figures.

DETAILED DESCRIPTION OF THE PREFERRED EMBODIMENTS

Figure 1:
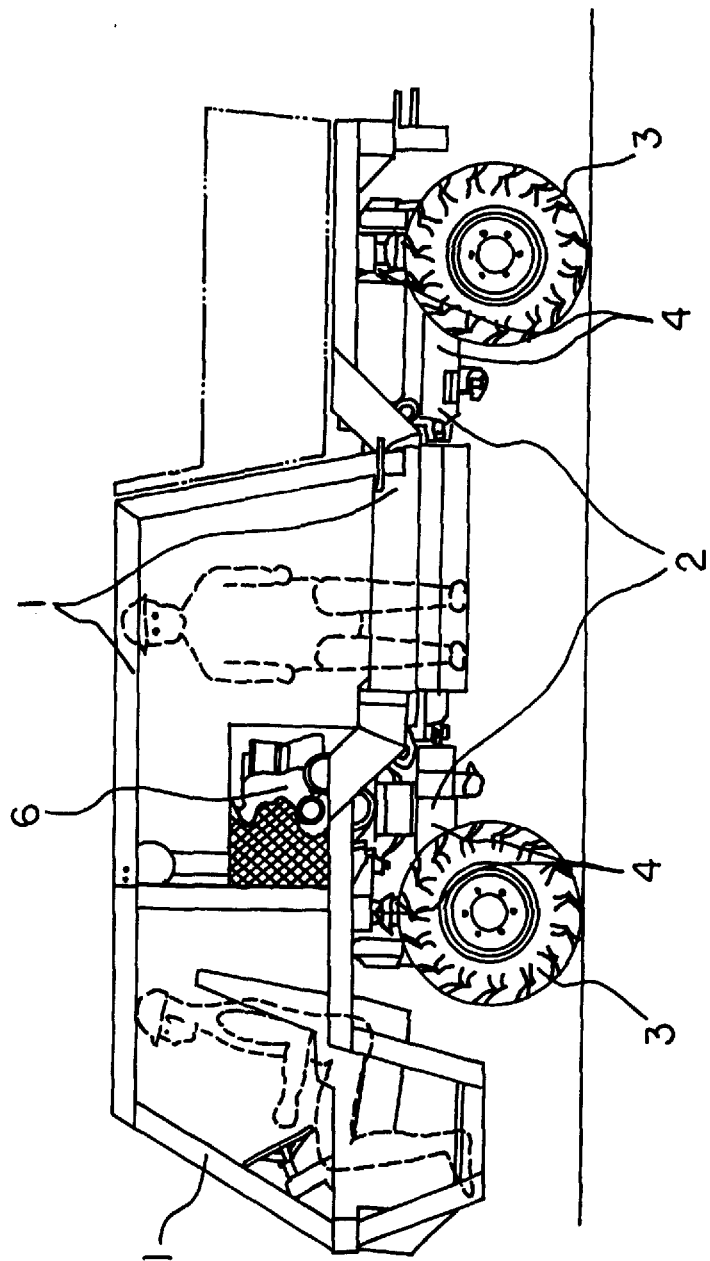
FIG. 1 is a side view of a vehicle according to the present invention which shows a vehicle chassis and frame body as well as part of the suspension and steering assemblies.
Figure 2:
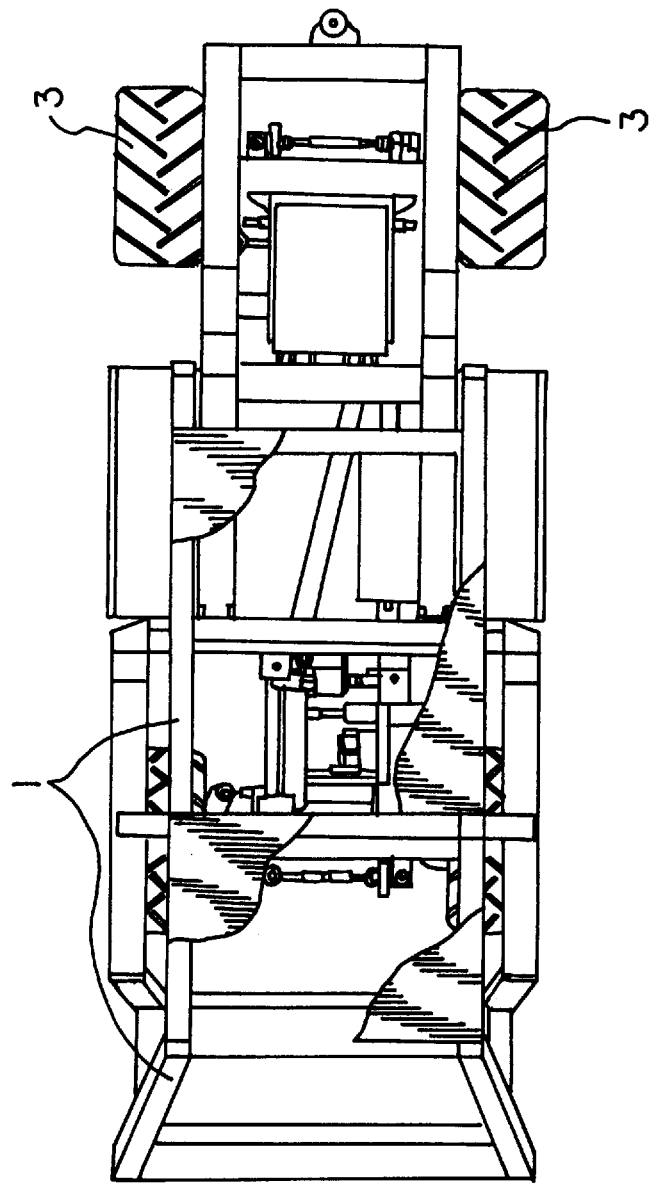
FIG. 2 is a plan view of a vehicle according to the present invention which shows a vehicle chassis and frame body as well as part of the suspension and steering assemblies.
Figure 3:
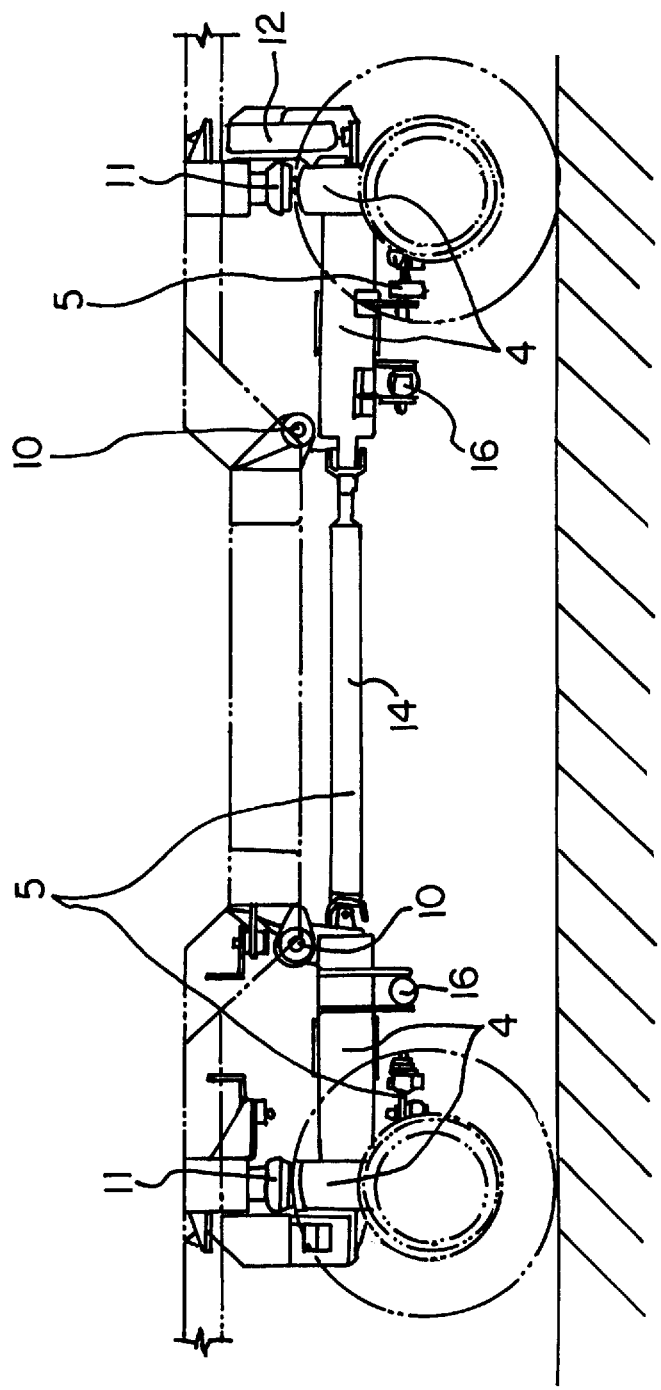
FIG. 3 is a side view of a vehicle chassis and the steering and suspension assemblies.
Figure 4:
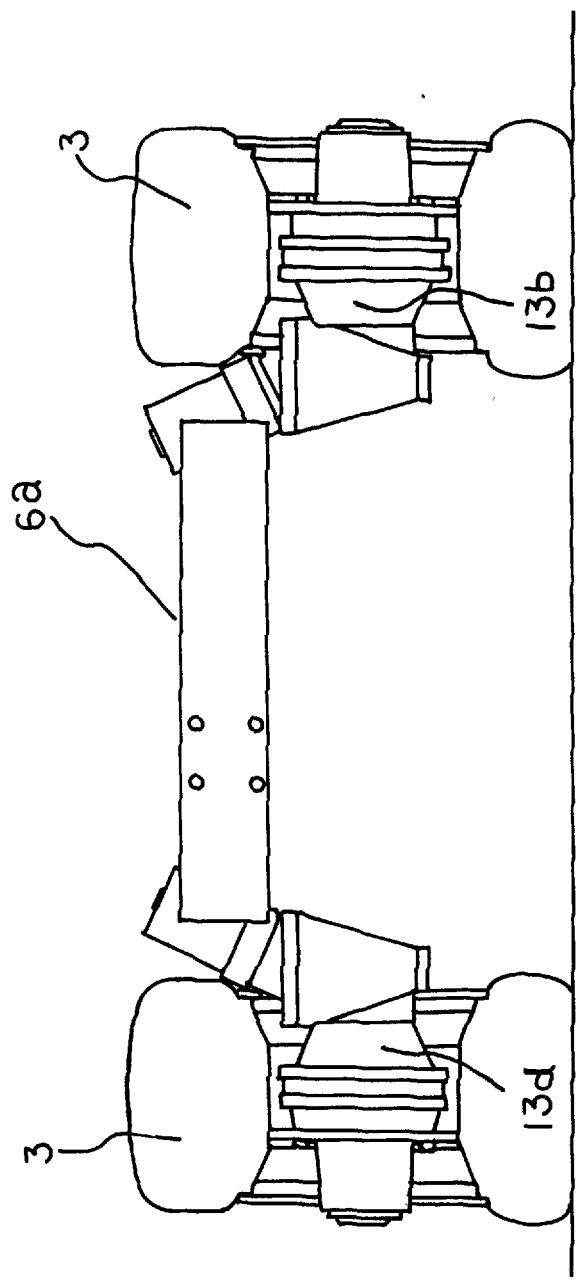
FIG. 4 is an end view of part of the steering and suspension assemblies.
Figure 5:
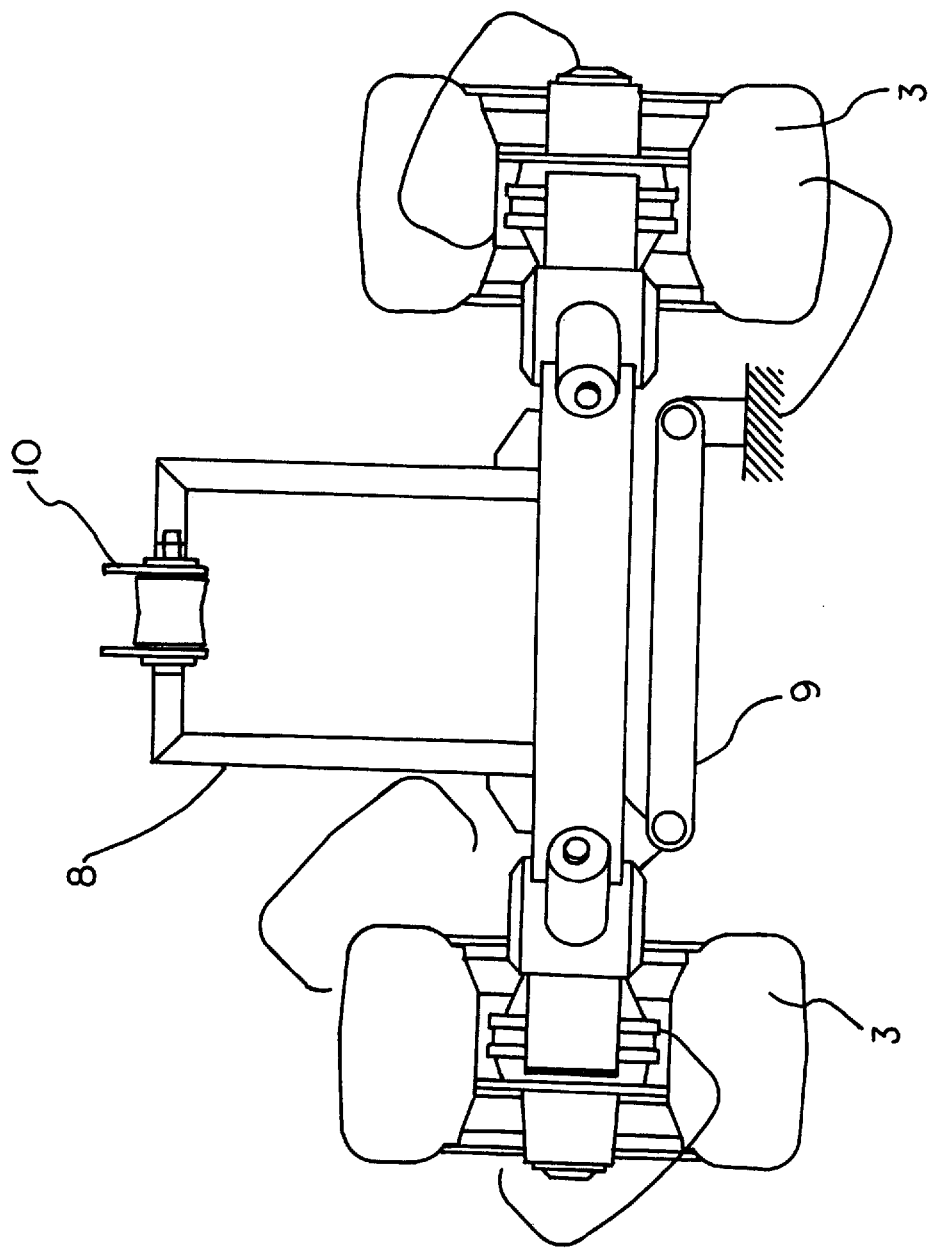
FIG. 5 is a plan view of the steering assembly connecting two wheels.
Figure 6:
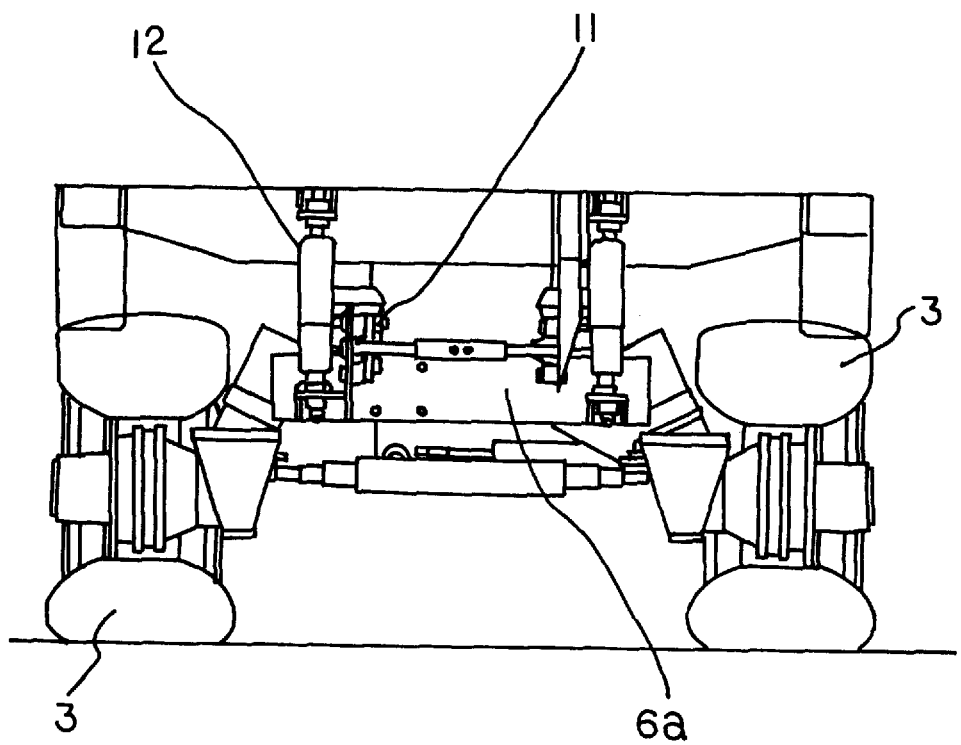
FIG. 6 is an end view of the steering and suspension assembly.
Figure 7:
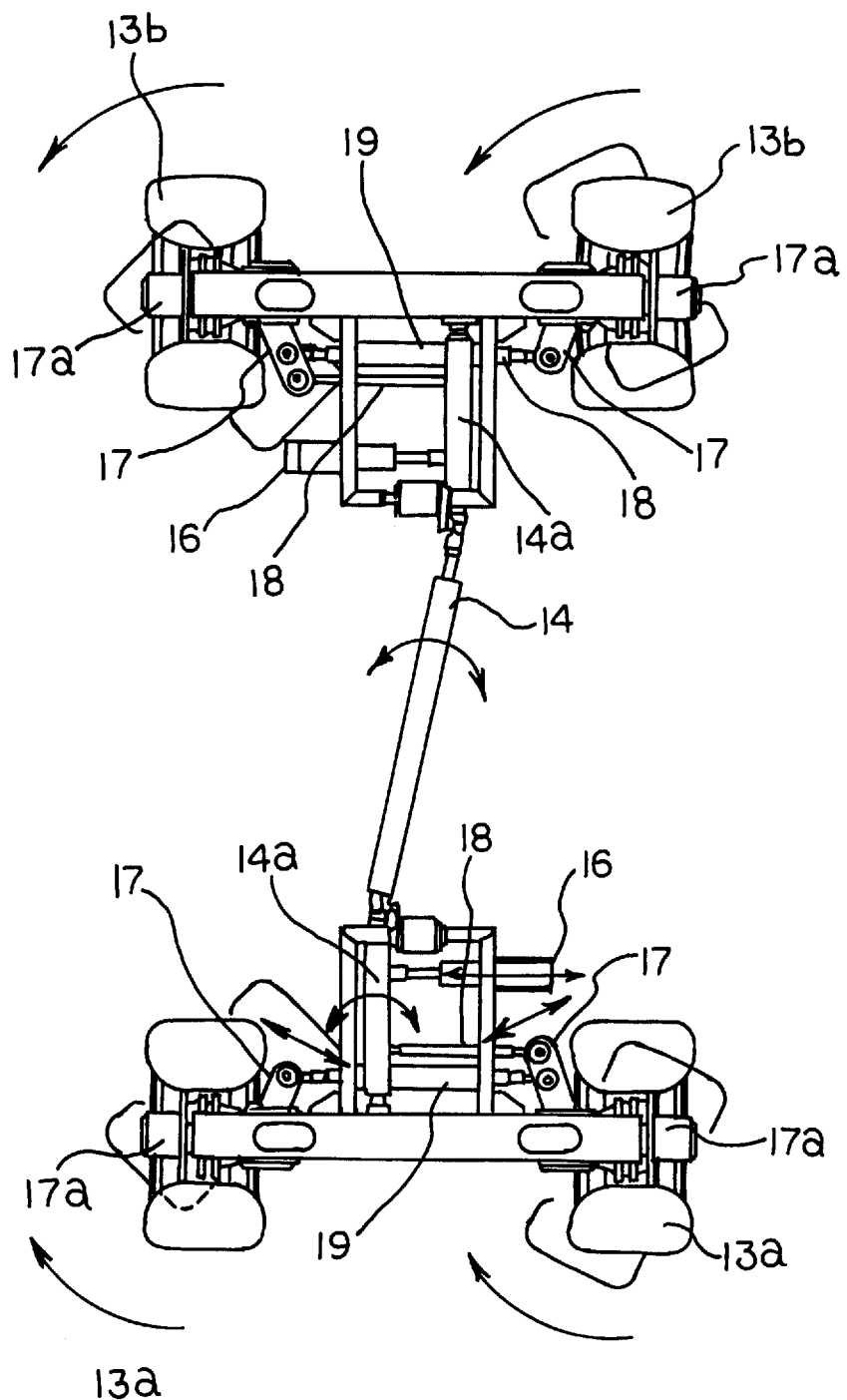
FIG. 7 is a plan view of the steering assembly.

Referring now to the drawings and in particular FIGS. 1, 2 and 3, an example of a vehicle according to the present invention is shown which includes a straight frame 1 mounted on a chassis indicated generally by reference numeral 2 and which comprises ground wheels 3, the suspension assembly and wishbone configuration indicated generally by numeral 4 and a steering assembly indicated generally by numeral 5 and shown in detail in FIG. 7. The vehicle also includes a power source device and a pump means 6 and a hydrostatic drive system and hydrostatic transmission which is not shown in FIGS. 1 to 7 but which is shown schematically in FIGS. 8 and 9.

Reference will now be made to the individual systems of the invention.

Hydrostatic Drive System and Transmission

Figure 8:
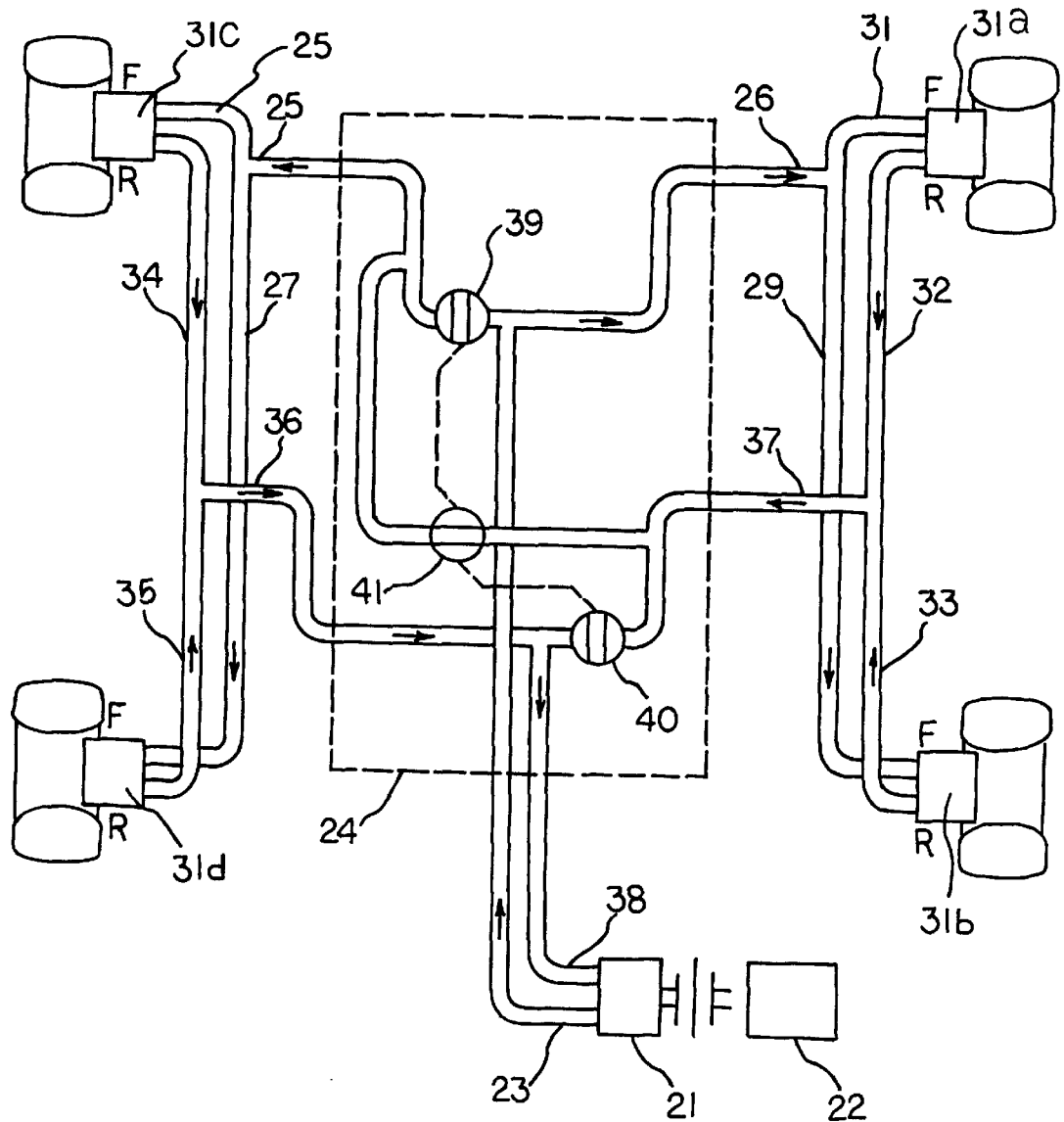
FIG. 8 is a schematic circulation diagram showing fluid flow through a network of fluid passages and the wheel motor means and the position of valves of the hydrostatic transmission in a high speed mode.
Figure 9:
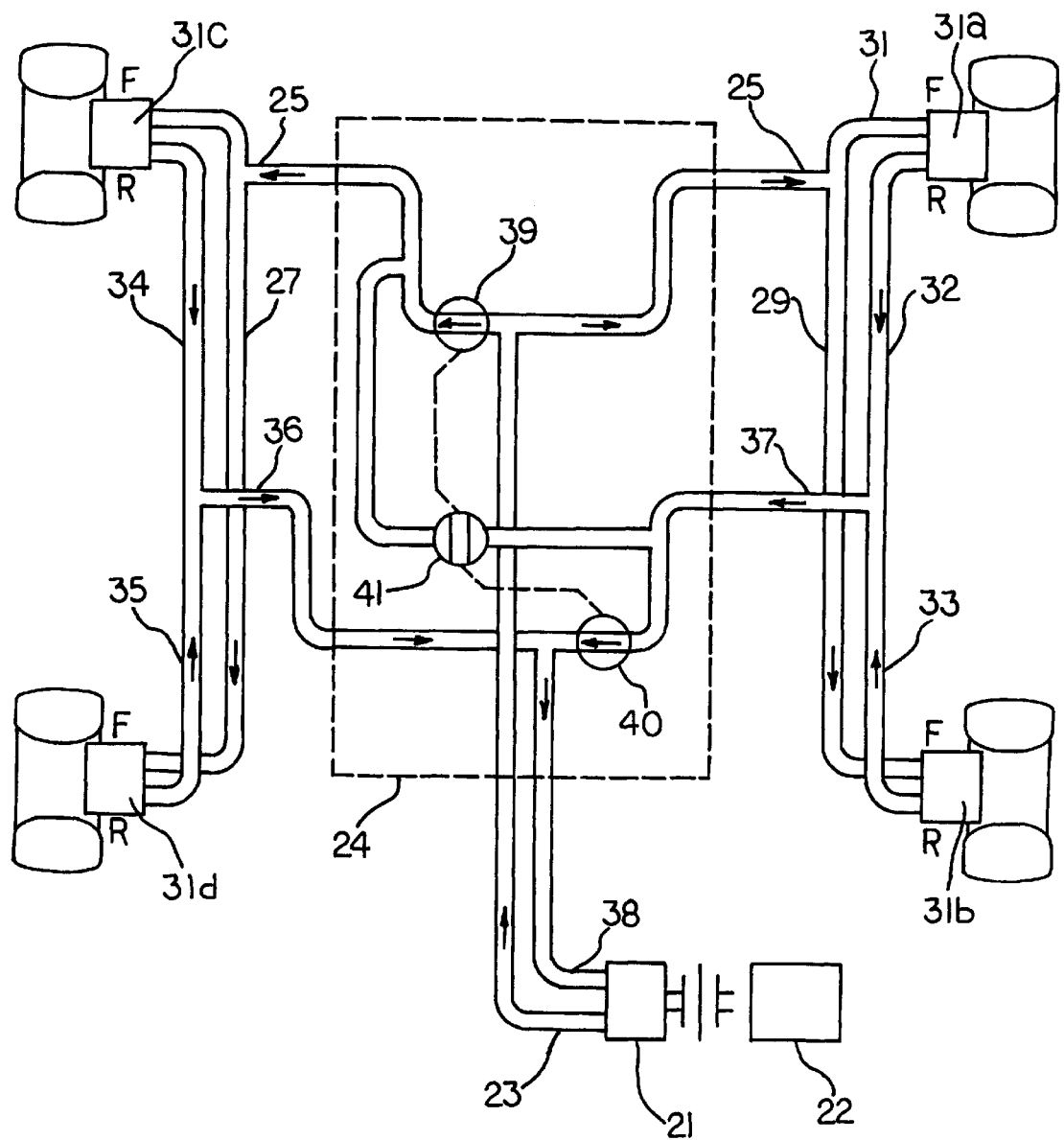
FIG. 9 is a schematic circulation diagram showing fluid flow through the wheel motors and the position of valves for the transmission in a low speed mode.

Referring to FIGS. 8 and 9, in the embodiment illustrated, the hydrostatic drive system and transmission comprises a closed network of fluid conduits and valves in fluid communication with four individual wheel motor means. This permits constant fluid flow to be provided to each wheel motor means. A fluid is circulated under pressure through a series of fluid passages by a suitable pump means 21 powered by a suitable drive means 22.

The speed of the individual wheel motors is varied by controlling the displacement of the main drive pump means 21 and by use of the network of conduits and valves. Conventional flow divider or combiner valves can be used. The latter valve block system in the preferred embodiment doubles the normal pump output range for a given displacement of the pump.

The hydrostatic drive system and hydrostatic transmission as shown in FIG. 8 is in a high range speed, reduced torque operation mode. In this mode, fluid flow is directed to only two wheels that in turn supply the other two wheels in series. Hydraulic pump 21 is driven by a drive means 22 and a suitable fluid such as hydraulic oil is circulated passing first through pump port 23. Valve 39 is in the closed position and the fluid is therefore diverted through passage 26 to passages 31 and 29 and then to the two right hand individual wheel motor means 31a and 31b respectively. The fluid, having passed through the said motor means is then returned via passages 32 and 33 to passage 37. With valve 40 in the closed position, the fluid is directed via the open valve 41 to passage 25 and then through passages 25a and 27 to the two left wheel motor means 31c and 31d respectively. After passing through the said left wheel motor means, the fluid is returned via passages 34 and 35 to passage 36. Since valve 40 is in the closed position, the fluid is then returned via passage 38 to the said hydraulic pump for recirculation. Thus, in this example, each motor means receives in sequence one-half of the fluid flow from the pump.

The pump 21 controls neutral and reverse speeds by internally changing the flow and direction of the fluid.

By reversing the direction of the fluid flow, the fluid follows the identical path as described in the preceding paragraph but in reverse sequence. This enables the wheel motor means to be operated in a direction reverse to that described in the preceding paragraph and allows for the operation of the vehicle in both forward and reverse directions.

The hydrostatic drive system as shown in FIG. 9 is in a low range speed operation mode. Hydraulic pump 21 is driven by the drive means 22 and the fluid is circulated passing first through pump port 23. Valve 39 is in the open position and the fluid is therefore equally diverted to both passages 25 and 26. The fluid circulating via passage 26 is then directed to passages 31 and 29 for circulation through the two right hand individual wheel motor means 31a and 31b respectively. In a like manner and at the same time, the fluid circulating via passage 25 is then directed to passages 25a and 27 for circulation through the two left hand individual wheel motor means 31c and 31d respectively. The fluid having passed through the said right hand wheel motor means is returned via passages 32 and 33 to passage 37 while at the same time the fluid which circulated through the said left hand wheel motor means is then returned via passages 34 and 35 to passage 36. With valve 41 in the closed position, the returning fluid from the right hand wheel motor means is directed via open valve 40 to passage 38 and the fluid returning via passage 36 is also directed to passage 38 and all of the fluid is then returned to pump 21 for recirculation. Thus, in this example, each motor means receives one-quarter of the fluid flow from the pump.

By reversing the direction of the fluid flow, the fluid follows the identical path as described in the preceding paragraph but in reverse sequence. This enables the wheel motor means to be operated in a direction reverse to that described in the preceding paragraph and allows for the operation of the vehicle in both forward and reverse directions.

The valves in FIGS. 8 and 9 of the hydrostatic transmission can be operated to either open or close them in a number of ways such as, but not limited to, mechanically, electrically, pneumatically, or hydraulically. In this example, the operation of valve 41 is synchronized with that of valves 39 and 40 so that when valve 41 is open, valves 39 and 40 are closed and vice versa. The opening and closing of the valves alters the pattern of fluid flows within the fluid passage network and results in high and low range speeds of operation.

The transition from a high speed to a low speed operation mode by using the valve block system also serves to impart a braking action to slow the vehicle.

Steering Assembly

Referring to FIGS. 3 to 7 and in particular FIG. 7, an example of a steering assembly which is counter configured according to the present invention is shown and which turns the front wheels 13a in a direction counter to the direction of turning of the rear wheels 13b.

The steering assembly comprises a central rotatable shaft 14 which is operably connected at either end to shafts 14a. The shafts 14a are operably connected to hydraulic means such as hydraulic cylinders 16 and to drag links 18 and steering tie-rods 19. The said drag links and steering tie-rods are in turn operably connected to steering links 17. Each steering link is operably connected to a stub axle 17a.

The fluid pistons are in a spaced and opposed relationship and include a fluid delivery system for delivering fluid to the pistons.

The steering assembly as shown in FIG. 7 operates as follows: the front to rear steering timing is controlled by the rotatable shaft assembly indicated by 14 and 14a. The central rotatable shaft assembly is turned via two hydraulic cylinders 16 that each exert force on the shafts 14a to which they are respectively operably connected. The force imparted by each of the two cylinders 16 should, in theory, be equal within industry tolerances if identical cylinders are used. In practice, however, fluid cylinders operate with bleed-by and with use, as the cylinder components wear, the amount of force exerted by the cylinders will deviate from specifications. Since the amount of the deviation will be different in each of the cylinders, the forces imparted on each of the rotatable shaft assemblies 14 and 14a will not be counter-balanced with the result that without a timing linkage, the front wheels would turn at a radius different from that of the rear wheels. The central rotatable shaft 14 ensures that the rotation over the entire series rotatable steering shafts 14, 14a and 16 all rotate at the same rate and thus an equal amount of steering force is imparted to the front and rear wheels via the steering linkages 17, 18 and 19. This serves to impart an equal rotational steering force to the shaft assembly and such force is transferred to the drag links 18 and steering tie-rods 19 which in turn transfer the steering force to the steering links 17 and the stub axles 17a causing both front and rear wheels to turn and ultimately steer the vehicle according to the amount of steering force applied.

Suspension System

The suspension and drive systems are fabricated in a wishbone modular configuration such as that indicated by reference numerals 6a, 7 and 8 shown in FIGS. 3, 4, 5 and 6. The same wishbone module configuration is used for both front and rear wheel suspension and steering systems. The vehicle includes a suspension system having a resiliently deformable device 11 for supporting the frame body on the chassis. The suspension system is fabricated in a front and rear wishbone configuration generally indicated by reference numerals 6, 7 and 8. The wishbone configurations are located side-to-side by a positioning link 9 which provides lateral stability and a single thrust assembly 10 containing a neoprene element (not shown) which transmits steering, braking and acceleration forces to the frame 42 while maintaining shock isolation. The thrust assembly 10 also serves as a point of connection between the wishbone assembly and the frame 42. The vertical movement of the wishbone configuration is controlled by neoprene elements 11 or other resiliently deformable suspension devices. In this example, the neoprene elements are used in conjunction with shock absorbers 12.

The vehicle has the added advantage in another embodiment of having a control interface system that combines a mechanical operator's throttle input signal to control both the swash plate angle in the hydraulic drive pump and the appropriate signal to the engine throttle control to match engine power output to hydraulic pump power demands for a given time/load window. This interface is controlled by either mechanical or electric/electronic means to match the requirements of engine throttle and pump swash plate position signal to the operator's throttle input signal and encompasses an anti-locking system for the hydrostatic drive.

From the above description and as will be seen from the drawings, the invention provides several unique advantages and improvements compared to known equipment. In terms of the application of the invention as a specialty utility vehicle, it will be seen that in one embodiment there is disclosed a uniquely configured construction which may be made using relatively large tubular sections; the vehicle may thus be constructed in a manner so as to be devoid of exterior body metal which will thus minimize damages under severe service usage.

The vehicle has the added advantage in another embodiment of being able to be configured to carry a variety of load carrying modules, such modules comprising but not limited to one or more of the following: personnel, equipment, dump bodies, flat decks, aerial devices and cranes and, to support these modules safely during operation of the vehicle.

In yet another embodiment, the vehicle is constructed with a fully integrated roll-over and operator protective structure that is part of the integral design.

In yet another further embodiment, the vehicle is configured to be a high speed versatile utility vehicle with dimensions smaller than a conventional half-ton truck but having the capacity of a three-ton truck for payload and working ability. The compactness of the vehicle is the result of the driver/passenger cabin being placed low on the vehicle and in front of the front wheels, the engine being mounted cross-ways behind the front wheels and the remaining area from the engine to the rear of the vehicle being available to accommodate a variety of cargo carrying modules to yield a payload area in excess of eight feet.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A vehicle comprising, in combination,
   a vehicle frame and front and rear vehicle chassis, each of said front and rear chassis having wheels, hydrostatic wheel drive means, said hydrostatic wheel drive means including hydrostatic transmission means having a multi-range speed drive,
   a counter-configured steering assembly having a rotatable timing shaft, front and rear steering shafts each separately connected to said rotatable timing shaft, said front and rear steering shafts being operatively associated with said wheels of the respective front and rear chassis,
   force imparting means for rotating each of said steering shafts independently with said timing shaft equalizing the rotational speed of said front and rear steering shafts, and
   a suspension system suspending said vehicle frame on said front and rear chassis.

2. A vehicle according to claim 1, wherein said wheel drive means is associated with each wheel, and said hydrostatic drive means comprising a plurality of fluid passages in fluid communication with each other and in communication with said wheel drive means of each wheel.

3. A vehicle according to claim 2, wherein said transmission means comprises said fluid passages having a valve assembly for controlling fluid flow within said passages and to said wheel drive means to control the speed of said wheel drive means.

4. A vehicle according to claim 3, wherein said valve assembly comprises at least one valve having an open position and a closed position for selectively controlling fluid flow in said fluid passages.

5. A vehicle according to claim 2 wherein said wheel drive means comprises individual wheel motors.

6. A vehicle according to claim 1, wherein said force imparting means for rotating each of said drive shafts comprises hydraulic means, and wherein the rotational motion of each drive shaft is conveyed to said wheels by linkage means.

7. A vehicle according to claim 1, further comprising a driver/passenger cabin on said front chassis extending forwardly and downwardly of the wheels of said front chassis, and a transverse engine mounted rearwardly of the wheels of said front chassis.

8. A vehicle according to claim 1, wherein said vehicle frame is a straight frame extending between said front and rear chassis.

9. A vehicle according to claim 1, wherein said suspension system and said force imparting means are in a wishbone configuration.

10. In a vehicle having a chassis comprised of spaced-apart front and rear assemblies, and front and rear wheels associated with a respective one of said spaced-apart assemblies, the improvement comprising hydrostatic wheel drive means, said drive means including a hydrostatic transmission means having a multi-range speed drive;

in combination with a counter-configured steering assembly, said steering assembly comprising:
a central rotatable timing shaft having a pair of opposed ends,
a pair of opposed rotatable drive shafts, one each being operatively connected to a respective end of said timing shaft,
connecting means associated with each of said drive shafts to operatively connect each of said drive shafts with respective front and rear wheels;
hydraulic means associated with each of said drive shafts for selectively rotating each said drive shaft with said central timing shaft, when rotating, equalizing the rotational speed of s aid drive shafts.

11. A vehicle according to claim 10, said vehicle having wheel motor means associated with each wheel, and wherein said hydrostatic transmission comprises a plurality of fluid passages being in fluid communication with each other and with said motor means of each wheel, and valve means operatively associated with said fluid passages for diverting said fluid to selected wheel motor means for high and low range speed modes.

* * * * *